(12) United States Patent
Hansen et al.

(10) Patent No.: US 7,254,219 B1
(45) Date of Patent: Aug. 7, 2007

(54) METHOD AND SYSTEM FOR ONLINE CALL MANAGEMENT

(75) Inventors: Benjamin E. Hansen, Denver, CO (US); Leo R. Quintanar, Boulder, CO (US); Scott Morrison, Lakewood, CO (US)

(73) Assignee: Qwest Communications International Inc., Denver, CO (US)

( * ) Notice: Subject to any disclaimer, the term of this patent is extended or adjusted under 35 U.S.C. 154(b) by 523 days.

(21) Appl. No.: 09/660,785

(22) Filed: Sep. 13, 2000
(Under 37 CFR 1.47)

Related U.S. Application Data

(60) Provisional application No. 60/153,847, filed on Sep. 14, 1999, provisional application No. 60/153,790, filed on Sep. 14, 1999, provisional application No. 60/153,852, filed on Sep. 14, 1999, provisional application No. 60/153,910, filed on Sep. 14, 1999.

(51) Int. Cl.
*H04M 1/64* (2006.01)

(52) U.S. Cl. .................. 379/88.17; 379/93.01; 370/352

(58) Field of Classification Search ............ 379/88.13, 379/88.17, 88.19–88.25, 202.01, 203.01, 379/204.01, 205.01, 207.01, 207.14, 207.15, 379/210.02, 211.01, 211.02, 212.01, 215.01, 379/220.01, 221.01, 93.09, 93.35, 142.01, 379/142.02, 93.01; 370/352, 355, 356, 389, 370/392, 40, 410, 522, 402
See application file for complete search history.

(56) References Cited

U.S. PATENT DOCUMENTS

| | | | | |
|---|---|---|---|---|
| 5,724,412 A | * | 3/1998 | Srinivasan | 379/93.23 |
| 5,805,587 A | * | 9/1998 | Norris et al. | 370/352 |
| 6,031,896 A | * | 2/2000 | Gardell et al. | 379/88.17 |
| 6,078,581 A | * | 6/2000 | Shtivelman et al. | 370/352 |
| 6,145,002 A | * | 11/2000 | Srinivasan | 709/225 |
| 6,219,413 B1 | * | 4/2001 | Burg | 379/215.01 |
| 6,259,692 B1 | * | 7/2001 | Shtivelman et al. | 370/352 |
| 6,317,488 B1 | * | 11/2001 | DePond et al. | 379/93.35 |
| 6,351,464 B1 | * | 2/2002 | Galvin et al. | 370/356 |
| 6,353,611 B1 | * | 3/2002 | Norris et al. | 370/356 |
| 6,421,339 B1 | * | 7/2002 | Thomas | 370/352 |
| 6,421,437 B1 | * | 7/2002 | Slutsman | 379/201.02 |
| 6,515,968 B1 | * | 2/2003 | Combar et al. | 370/252 |
| 2004/0005045 A1 | * | 1/2004 | Adams et al. | 379/88.17 |
| 2004/0240651 A1 | * | 12/2004 | Adams et al. | 370/352 |

* cited by examiner

*Primary Examiner*—Ovidio Escalante
(74) *Attorney, Agent, or Firm*—Townsend and Townsend and Crew, LLP

(57) ABSTRACT

A method of managing a telephone call from a calling station to a called station having a telephone service, where the called station is capable of connection to the Internet comprising the steps of forwarding the called station telephone service to an intermediate server upon the called station launching an Internet connection responsive to a telephone call from a calling station received by the intermediate server, sending a communication to the called station including available calling station identification information and a query to the called station via the Internet requesting a decision from a list of call disposition options for the telephone call receiving a decision from the called station choosing at least one call disposition option and performing an action according to the call disposition option.

20 Claims, 8 Drawing Sheets

ONLINE CALL MANAGEMENT METHOD LAUNCHES DURING INTERNET DIAL-UP LAUNCH — 30

↓

SUBSCRIBER TELEPHONE SERVICE FORWARDS TO APPLICATION SERVER — 32

↓

INCOMING CALL MADE AND RECEIVED AT APPLICATION SERVER — 34

↓

SCREEN VIEWABLE MESSAGE SENT TO SUBSCRIBER VIA INTERNET — 36 INCLUDING

↓

AVAILABLE CALLING STATION IDENTIFICATION INFORMATION — 38

AND

↓

A QUERY TO THE SUBSCRIBER FROM A LIST OF DISPOSITION OPTIONS — 40

ANSWERING THE TELEPHONE CALL OVER THE DATA NETWORK — 42

ANSWERING THE TELEPHONE CALL USING A PUBLIC SWITCHED NETWORK — 44

IGNORING THE TELEPHONE CALL — 46

SENDING THE TELEPHONE CALL TO A VOICEMAIL SYSTEM — 48

FORWARDING THE TELEPHONE CALL TO A DIFFERENT TELEPHONE NUMBER — 50

PLAYING AN ANNOUNCEMENT TO THE CALLING STATION — 52

PLACING THE CALLING STATION ON HOLD — 54

ADDING THE CALLING STATION TO A CONFERENCE CALL BRIDGE — 56

HANGING UP THE TELEPHONE CALL — 58

RECEIVING A DECISION FROM THE SUBSCRIBER CHOOSING AT LEAST ONE CALL DISPOSITION OPTION; — 60

↓

PERFORMING RESPECTIVE ACTION ACCORDING TO THE CALL DISPOSITION OPTION. — 62

Figure 2

METHOD AND SYSTEM FOR ONLINE CALL MANAGEMENT

TECHNICAL FIELD

This invention relates to a method and system for online call management and more specifically to a method and system for managing incoming calls while a subscriber is connected to a data network (the Internet).

BACKGROUND ART

As use of the Internet (a.k.a. the World Wide Web) becomes more and more prevalent, solutions to certain Internet use related problems are required. One such problem is the concern an Internet subscriber may have in missing phone calls while connected to the Internet via a common telephone line. Currently, homes and small businesses commonly utilize only one telephone line. If a subscriber is connected to the Internet via the sole telephone line, incoming third party calls are not taken.

One common solution for voice calls is Call waiting. Call waiting is a telephone feature that is provided by a telephone switching office to alert a called party to an incoming call when the called party is already taking another call. The alerting is often implemented by transmitting a subtle tone or click to the called party while the called party is still taking the first call. At that point, the called party may place the existing call on hold and answer the incoming call. Obviously, this clicking or tone alert system cannot apply to subscribers connected to the Internet.

U.S. Pat. No. 5,805,587 to AT&T Corp describes a call notification feature for a telephone line connected the Internet. A method is described for processing a telephone call from a calling station to a called station as a result of having established a connection to a data network via an access server. The call is received at a telephone switch responsive to the called station being busy. The call is then forwarded to the access server. A data message is then sent to the called station via a connection to the data network to alert the subscriber to the receipt of the call. The method of U.S. Pat. No. 5,805,587 specifically forwards the call to an access server, only after notification that the called station is busy.

Consequently, a need has developed for an method and system for managing incoming calls while a subscriber is connected to a data network (the Internet) that is invisible to the subscriber, has the "look and feel" of current computer environments and is an alternative both economically and functionally for placement of second line.

DISCLOSURE OF INVENTION

It is the principal object of the present invention to provide a method of managing a telephone communication or telephone call received by a subscriber when the subscriber is connected to the Internet where the subscriber receives a viewable message detailing caller identification information from which the subscriber chooses an option on how to handle the telephone call.

It is another object of the present invention to provide a method of managing a telephone communication or telephone call regardless of connection status.

It is still another object of the present invention to provide a method of managing a telephone call received by a subscriber by forwarding the subscriber's telephone service to an application server.

It is a further object of the present invention to provide a method of managing a telephone call received by a subscriber by forwarding the subscriber's telephone service to an application server when the subscriber's computer system launches an Internet dialing program.

It is a still a further object of the present invention to provide a method of managing multiple telephone calls at any given time received by a subscriber when the subscriber is connected to the Internet.

In carrying out the above object, there is provided a method of managing a telephone call from a calling station to a called station having a telephone service where the called station is connected to a data network comprising the steps of forwarding the called station telephone service to an application server upon connection of the called station to the data network, responsive to a telephone call from a calling station, sending a query to the called station via the data network requesting disposition of said telephone call and receiving a decision on the disposition of said telephone call from the called station.

It is a still further and more specific object of the present invention to provide a method of managing a telephone call from a calling station to a called station having a telephone service, where the called station is capable of connection to the Internet comprising the steps of forwarding the called station telephone service to an application server upon the called station launching Internet connection software, responsive to a telephone call from a calling station received by the application server, sending a communication to the called station including available calling station identification information and a query to the called station via the Internet requesting a decision from a list of call disposition options for the telephone call, receiving a decision from the called station choosing at least one call disposition option and performing an action according to the call disposition option.

Is another object of the present invention to a list of call disposition options including answering the telephone call over the data network, answering the telephone call using a public switched network, ignoring the telephone call, sending the telephone call to a voicemail system, forwarding the telephone call to a different telephone number, playing an announcement to the calling station, placing the calling station on hold, adding the calling station to a conference call bridge, and hanging up the telephone call.

These and other objects, features, and advantages of the present invention will become more readily apparent by reference to the following description of the drawings wherein like reference numerals correspond to like components.

BRIEF DESCRIPTION OF DRAWINGS

FIG. 2 is a flow diagram representing the method of the present invention

BEST MODE FOR CARRYING OUT THE INVENTION

An illustrative embodiment of the present invention is discussed herein in the context of a public switched network in conjunction with what is commonly referred to as the world wide web or the Internet. This is discussion is not a limitation as the present invention may be practiced under various telecommunications systems including private telecommunications networks.

Figure 1:
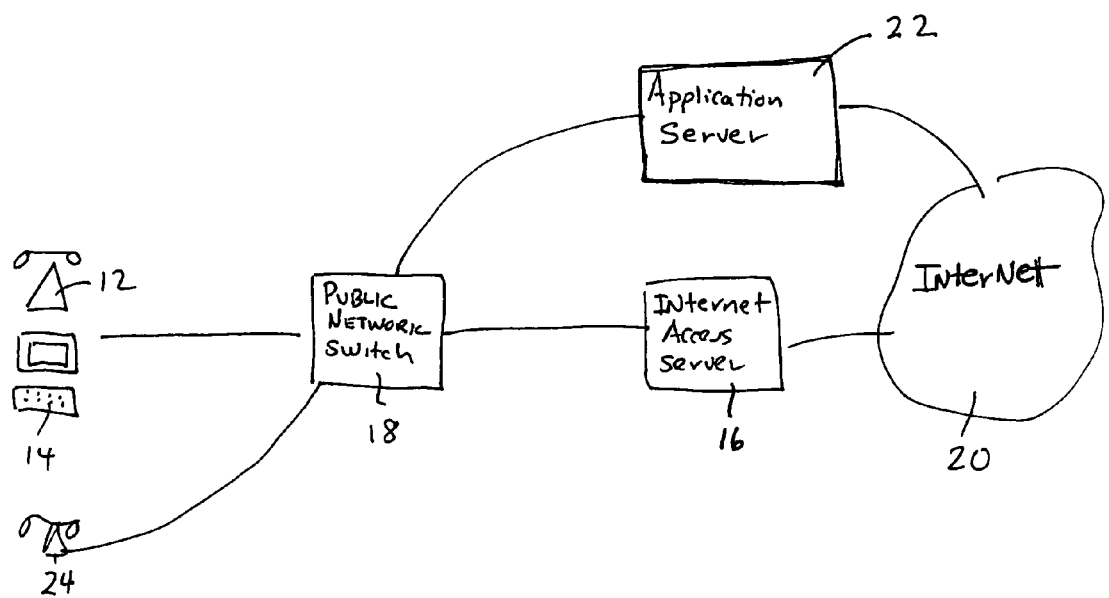
FIG. 1 is a diagrammatical representation of a telecommunications systems of which the present invention may operate.

Referring now to FIG. 1, there is shown one basic Internet connection method. The subscriber associated with calling station 12 utilizes appropriate Internet communications software as known in the art in conjunction with a personal computer 14 having telephony capability. The subscriber, through calling station 12 and computer 14 makes a telephone call to the Internet access service 16 (IAS) through the public switched network 18. Access to the Internet 20 is made in the conventional manner and communication between the personal computer at the calling station 12 and the Internet 20 occurs. For reference, the online call management method of the present invention operates as a service to telephony customers having Internet capability. A need has arisen for Internet users to be connected not only to the digital world but to their conventional voice communications as well. The online call management method operates when a online call management subscriber connects to the Internet. If a third party calling station or calling party makes a telephone communication such as for example a telephone call to the subscriber, and if the subscriber is "online" a "pop-up" window or screen viewable message appears identifying the party. It is contemplated by the present invention that a telephone communication may also be a facsimile transmission or other telephone communication. The subscriber may then choose from various call disposition options such as accept the call over the Internet, over the phone line conventionally, send the call to voicemail, forward the call or ignore or hangup the call. Preferably, the method works best with a subscriber with a personal computer with at least a 486 chip, access to the Internet through a modem with a minimum speed of 14.4 kbps and with common Internet Service Providers.

In using the online call management method of the present invention, as noted in the flow diagram of FIG. 2, the method, in the preferred embodiment, first uses the subscribers desire to connect to the Internet as a means of triggering the system. More specifically, when the subscriber takes the step 30 and launches some form of telephone communication such as for example an Internet dialing program, the online call management program resident in the subscriber's personal computer 14 initiates and takes the step 32 and action necessary to forward the subscriber's telephone service to an application server 22. This could also be launched from a fax transmission request or a chat session request. When a incoming call from a calling station 24 is made to the called station or subscriber, it passes through the public switched network 18 and is forwarded to the application server 22 as shown in step 34.

The application server 22 determines if the subscriber is logged on and locates the subscriber IP address. This may be accomplished by the application server 22 communicating with the IAS 16. Once a determination of connection status and IP address is made, the application server sends a screen viewable message 36 to the subscriber via the Internet which includes available calling station identification information 38 and a query 40 to the subscriber on the disposition of the call from a list of disposition options. These disposition options will be described in more detail below but include answering the telephone call over the data network 42, answering the telephone call using a public switched network 44, ignoring the telephone call 46, sending the telephone call to a voicemail system 48, forwarding the telephone call to a different telephone number 50, playing an announcement to the calling station 52, placing the calling station on hold 54, adding the calling station to a conference call bridge 56 and hanging up the telephone call 58.

The subscriber then makes decision 60 or chooses at least one disposition option, including ignoring the call as an option, and via the screen viewable message, communicates the decision back to the application server. An action 62 is then taken on the disposition option and the necessary steps are taken to perform the option. The following provides details on the various disposition options as contemplated by the present invention and further the preferred actions in carrying out the disposition decision.

Figure 3:
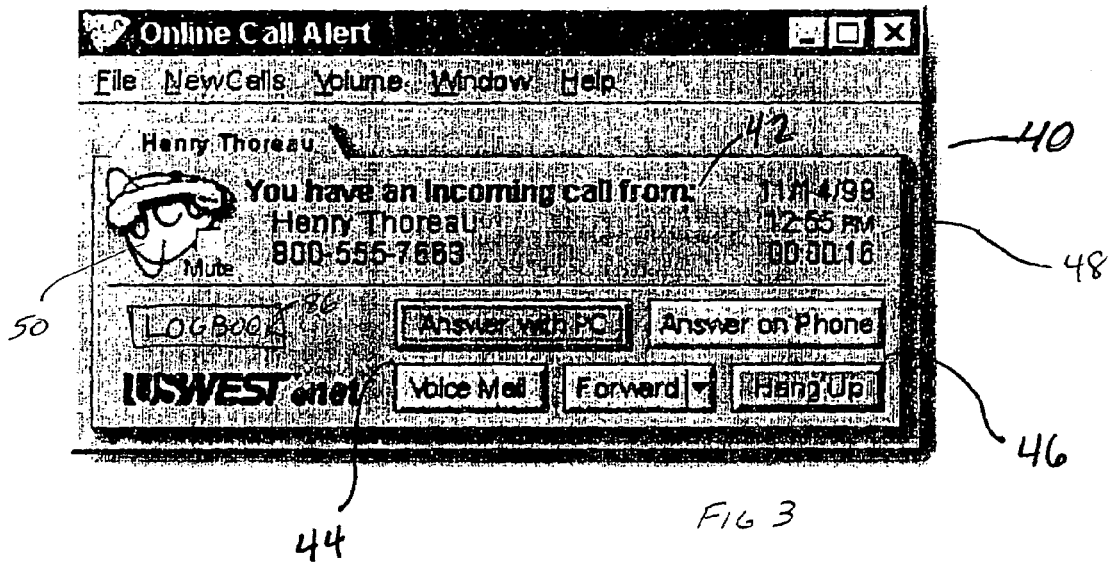
FIG. 3 is a diagrammatical representation of an incoming call message.

Referring to FIG. 3, there is shown the screen viewable message or communication 40 including available calling station identification information 42 and a query 44 requesting a decision from a list of call disposition options 46. In the preferred embodiment, the screen viewable message not only is the message available but an audible ringing simultaneously occurs through the personal computer sound system (not shown) until the subscriber chooses a disposition or a timeout occurs. The time and date 48 information is for the time of the initial call presentation and the chronometer counts up, in seconds, from that time through the duration of the call. The name of the calling party from available caller ID technology is centered on the screen viewable message 40. The audio or telephone icon 50 displays an off-hook state until the call is terminated or another disposition is selected.

Figure 4:
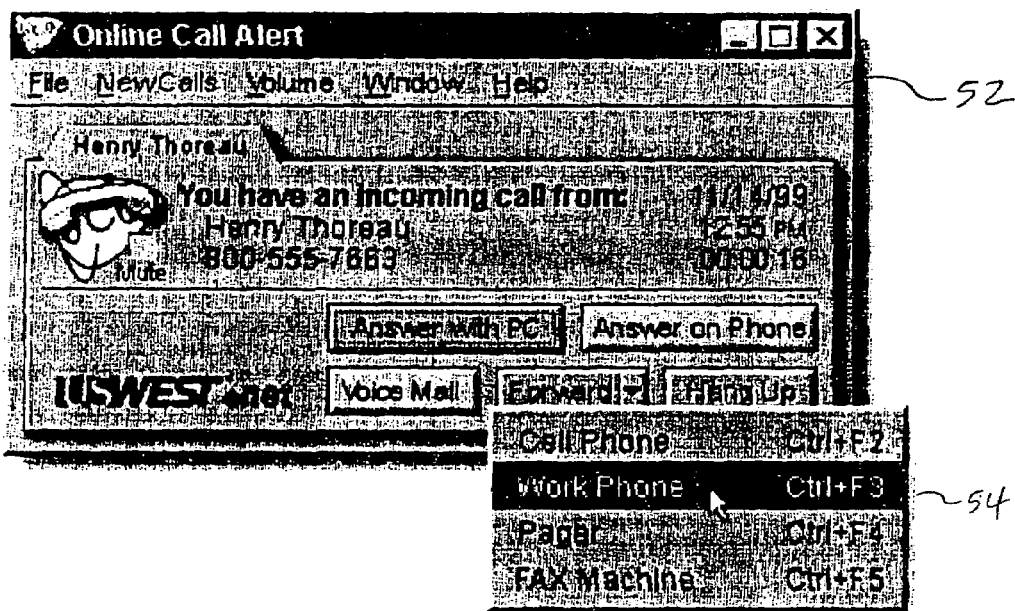
FIG. 4 is a diagrammatical representation of the call forwarding menu illustrating the call forward options.
Figure 5:
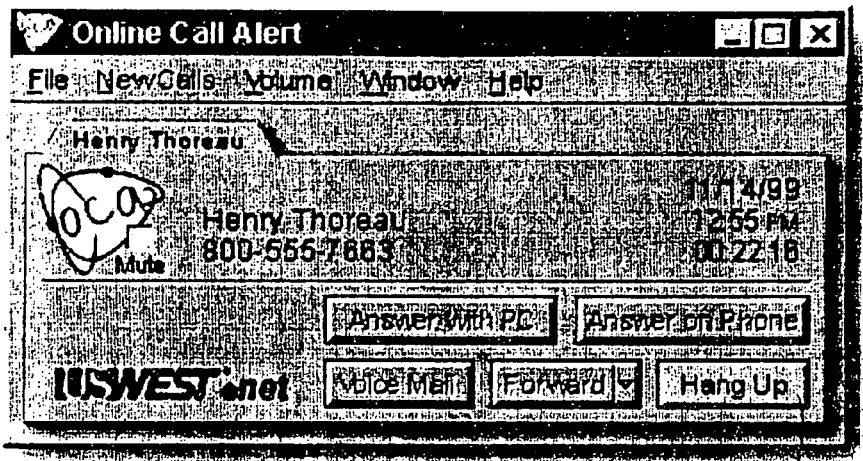
FIG. 5 is a diagrammatical representation of the incoming call message after the hang up option has been chosen.

As shown in FIG. 4, the call forward option message window 52 illustrates various options within the call forwarding mode. Selecting the forward option on the message window 52 brings up a second screen 54 with additional options. The "pop" up second screed 52 displays a list forwarding destinations as specified by the subscriber. This information is previously entered and allows for quick disposition of the forwarded call. The call is transferred as specified above when the subscriber completes a selection from the list. In FIG. 5, the screen viewable message shows the hang up option 60. Selecting the hang up option terminates the call from the calling station. The call is logged.

Figure 6:
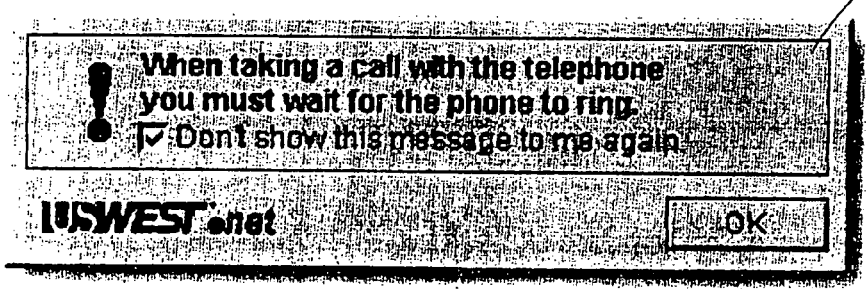
FIG. 6 is a diagrammatical representation of an alert window.

The option of taking the call using the public switched network, step 44 in FIG. 2, in the method of the present invention will result in the subscribers Internet connection being immediately dropped. The incoming call is then routed to the customer over the public switched network 18 by the application server 22. In the preferred embodiment, the subscriber using the online call management method of the present invention would be presented with a message alert window 62 notifying the subscriber that they must wait for the telephone to ring before picking up the telephone handset to take call as shown in FIG. 6.

Figure 7:
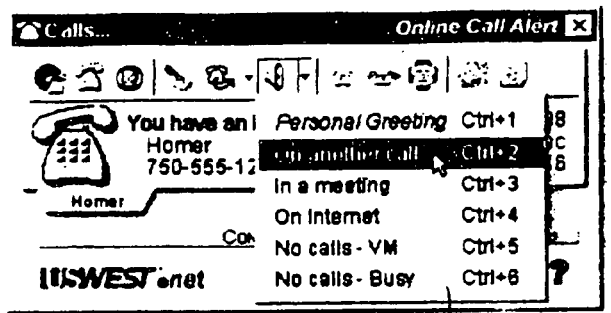
FIG. 7 is a diagrammatical representation of the play announcement pull down menu illustrating the play announcement options.

Referring to FIG. 7, the subscriber may choose the option of playing an announcement to the calling party. If the subscriber selects an announcement from the list 64, the calling party is immediately presented with the announcement selected by the subscriber. The voice announcements, in the preferred embodiment, are stored on the application server 22.

Figure 8:
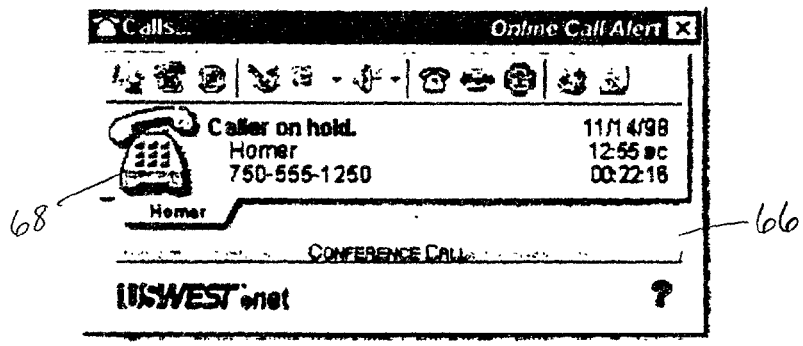
FIG. 8 is a diagrammatical representation of the hold menu.

FIG. 8 illustrates the hold option of the present invention. Choosing the hold option will place the current call on hold and bring up screen 66. In the preferred embodiment, the calling party will hear recorded music playing during the hold time period. The hold window will also display a blinking red telephone 68 an blinking red tab.

Figure 9:
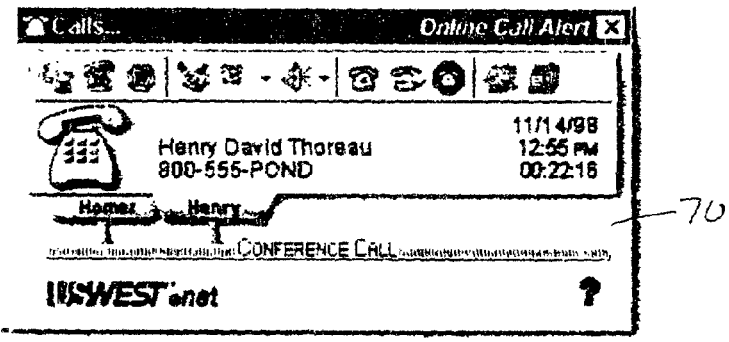
FIG. 9 is a diagrammatical representation of the conference call bridge menu.

As noted in FIG. 2, step 48, the subscriber may choose the option of sending the incoming call from the calling station to a voice mail system. In the preferred embodiment, when the call is sent to voice mail, a call window message (not shown) will be provided indicating the call has been sent to voice mail. Referring now to FIG. 9, an additional option of the method of the present invention is conferencing the incoming call into a single conference bridge as noted in screen message 70. Multiple callers may be conferenced into a single conference bridge.

Figure 10:
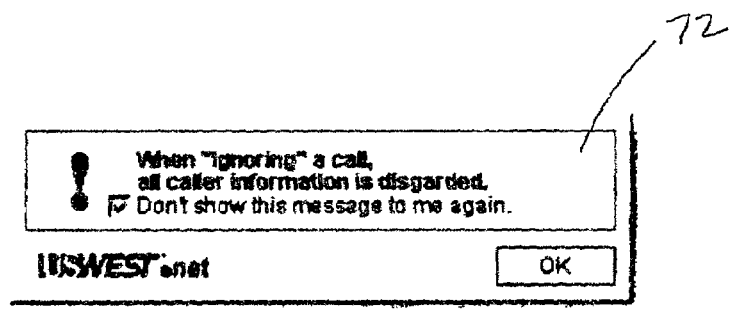
FIG. 10 is a diagrammatical representation of the ignore call menu.

FIG. 10 depicts the ignore call option 72. Choosing the ignore call option causes the incoming call window to return to the idle state. The call will proceed from the calling party point of view such as indefinite ringing. The subscriber's Internet connection is not effected. No log of the call is maintained.

As noted in step 42, the subscriber has the option of answering the incoming call over the Internet connection. The current Internet connection will not be dropped. Utilization of current Internet telephony hardware at the subscriber's personal computer 14 will allow the Internet connection to be made, such as headsets and microphone systems. When the Internet call is established, a message line will be sent to the subscriber indicating connection status.

Figure 11:
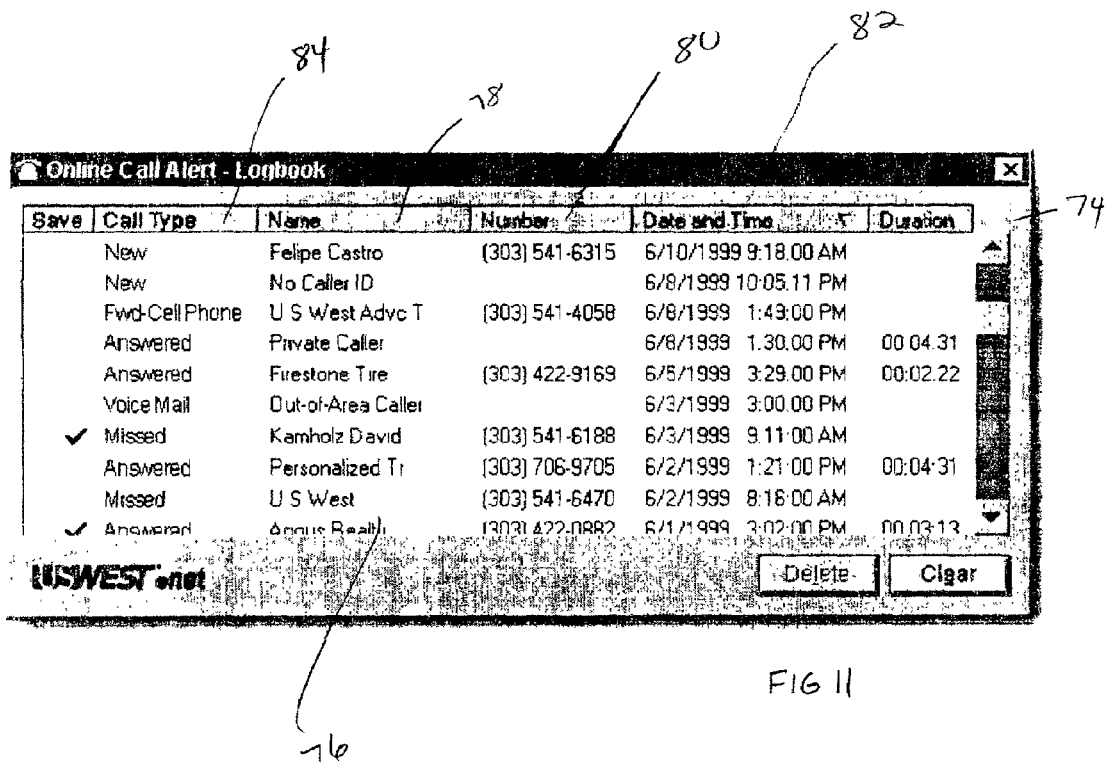
FIG. 11 is a diagrammatical representation of the logbook.

Referring to FIG. 11, there is shown the online call logbook viewable screen 74. In the preferred embodiment, all incoming calls are logged into the online call logbook 76. The name 78, number 80 and time stamp 82 are recorded according to the available caller ID information along with the call duration. The disposition of a call is noted in the call type 84 column. If the call was forwarded, the forwarding destination is included in the logbook. In al alternative embodiment of the present invention, the logbook option is a true option and only those calls which are positively noted by the subscriber. Referring to FIG. 3, the option logbook 86 is shown in phantom as ab alternative option.

The proposed system architecture for implementation of the present invention, may include for example, using existing AIN network architecture and incorporating the new functionality of the application server 22. The application server 22 would have connectivity capability to the AIN databases through a Get data interface across the TCP/IP. In addition, in some embodiments, the online call management system, when taking the call over the Internet 20 would use a ISP voice gateway. Those call taken over the Internet 20, in one embodiment, are routed to the ISP and the subsequent session is set up between the ISP and the subscriber.

Figure 12:
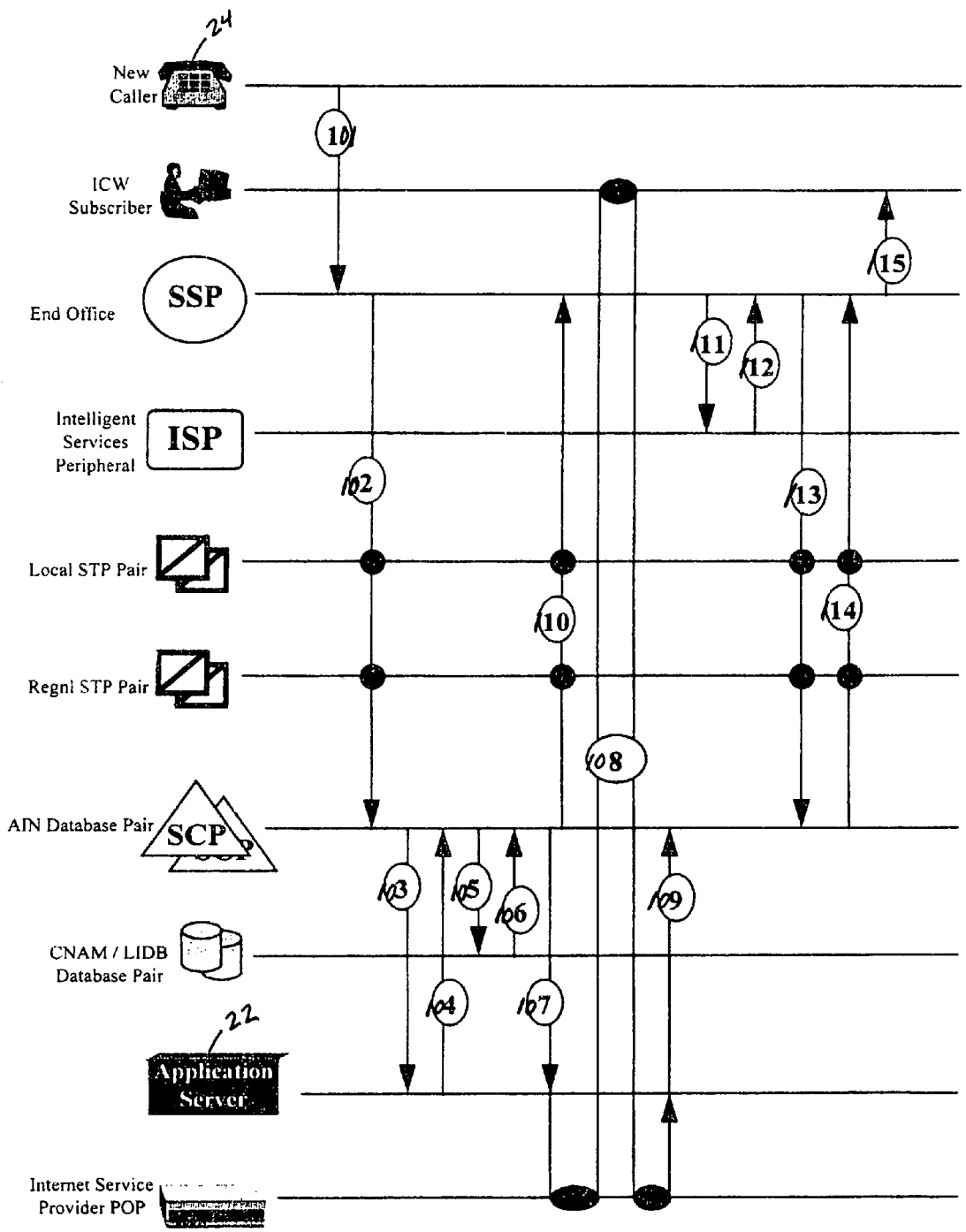
FIG. 12 is a flow diagram of the subscriber taking a phone communication over the public switched network.

Referring now to FIG. 12, there is shown a more specific flow diagram of the subscriber taking a phone communication over the public switched network in one embodiment of the present invention. For example, an incoming phone communication 101 is made from calling station 24 while the subscriber is currently on an Internet session. A termination attempt trigger is encountered in the subscribers serving office (service switching point SSP) and call processing is halted. An AIN termination attempt query is sent to the AIN database (SCP pair) via the SS7 network, routed through both the local and regional STP pairs as shown in step 102.

In step 103, the AIN database analyzes the incoming query and sends a get data query or subscriber status query to the application server 22 to determine if the subscriber is on an Internet session. In response, as shown in step 104, the application server sends a response or subscriber status response to the get data query with an indication that the subscriber is on an Internet session.

The AIN database sends a get data query to the LIDB SCP for CNAM as noted in step 105. The LIDB SCP sends a get data response with the CNAM information in step 106. In step 107, the AIN database then sends a get data query or present options query to the application server 22 instructing the gateway device to prompt the subscriber with a the application server sends a screen viewable message 36 to the subscriber via the Internet which includes available calling station identification information 38 and a query 40 to the subscriber on the disposition of the call from a list of disposition options as described above.

In step 108, the application server 22 sends message through the Internet service provider via the Internet access server 16 and the associated IP connection to the subscriber providing the screen viewable message 36. The subscriber, in this embodiment chooses to take the call over the public switched network PSTN 18 and "clicks" the appropriate option as noted in FIG. 3 as an option. The application server responds back to the AIN database that the call is to be routed over the PSTN 18 as noted in step 109. Initiated simultaneously or very short after step 107, the AIN database sends a send to resource message to the SSP across the SS7 network instructing the switch SSP to bridge a connection with the Intelligent Services Peripheral for an announcement as noted in step 110.

Figure 13:
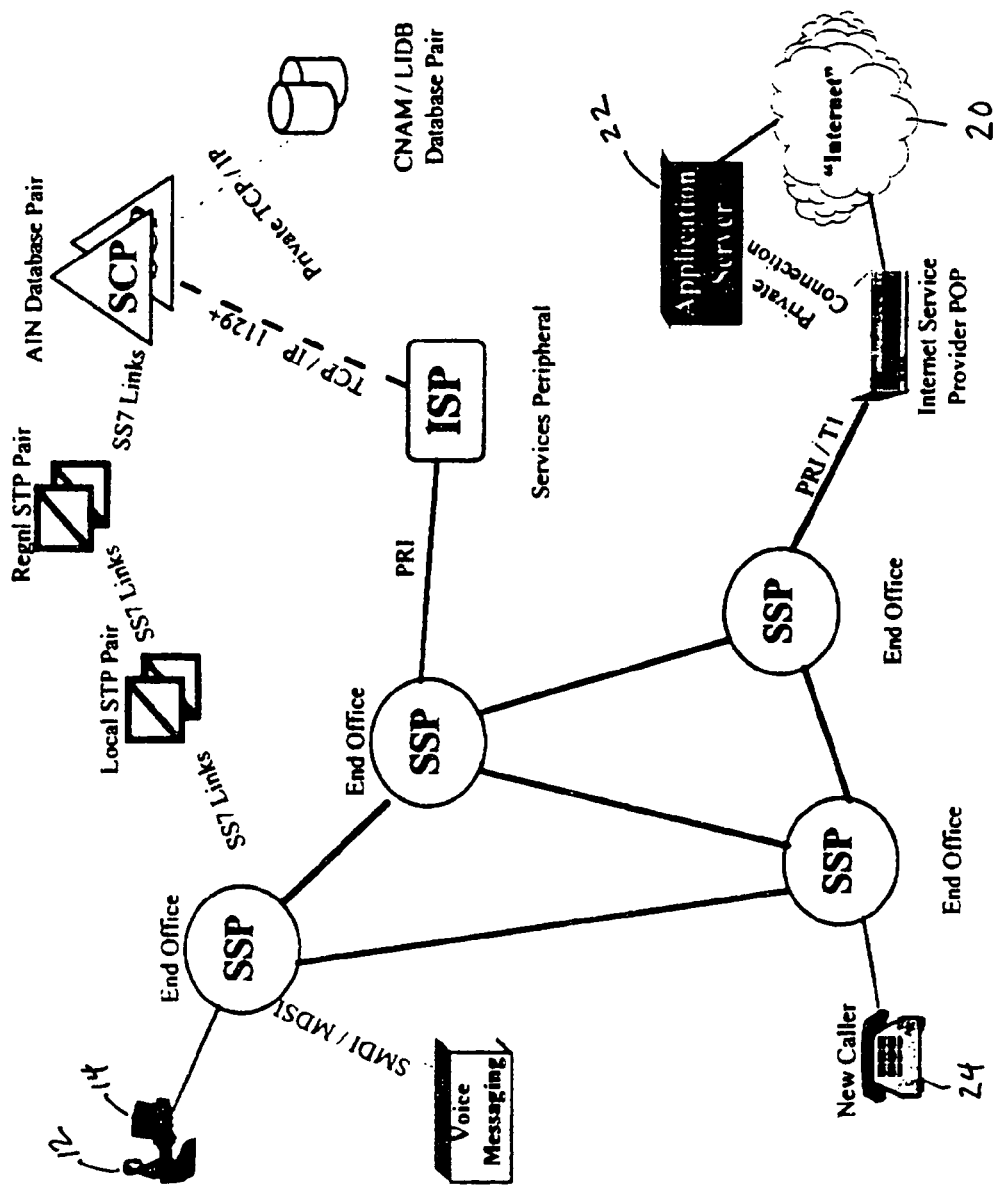
FIG. 13 is a diagrammatical representation of a more specific telecommunications systems of the present invention.

In step 111, the SSP establishes a connection with the ISP via a PRI connection from the SSP to the ISP for the announcement play-back. The ISP plays the announcement stating for example "please hold as we try to connect your party" as shown in step 112. In step 113, the SSP sends a resource clear message to the AIN database across the SS& network to let the AIN database know that the announcement is complete. The Ain database sends a response message back to the SSP to terminate the call to the subscriber. The SSP receives the message and forwards the call to the subscriber as noted in step 114. Finally, in step 115, the call is routed to the subscriber's line. FIG. 13 provides a more specific illustration of the one embodiment of a telecommunication system implementing the method of the present invention.

If the subscriber for example chooses to take the phone communication or call over the Internet, the steps noted above would be similar except the subscriber wold choose the appropriate option as noted in FIG. 5, namely the "answer with PC" 42. The database informs the SSP to bridge the call to the ISP for the gateway functionality. Further, if the subscriber chooses to forward the call to another number 50 or to voicemail 48, the SSP simply routes the call appropriately to either the forwarding number to the voicemail system while the subscriber maintains the Internet connection.

In certain circumstances, a subscriber may be online and engaged in an Internet phone call session when an additional incoming call comes in. The additional call is presented to the subscriber and preferable a soft, sort sound may be played to alert the subscriber to the additional call. The sound should be unobtrusive to the subscriber and unperceived by the party on the current call. The current call is not interrupted for either the new caller or the subscriber, other than the presentation of the additional incoming call information to the subscriber. The screen viewable message or communication 40 including available calling station identification information 42 and a query 44 requesting a decision from a list of call disposition options 46 displays as an additional message. The subscriber may handle the additional call in the following ways.

Hang up on the current call and handle the additional call as if it were being presented in the absence of any other call activity. The subscriber may opt to take the call as an IP call. The current call is immediately disconnected and the additional call session is set up. The subscriber may choose to send the call to voicemail. The additional call screen message will disappear and the additional call will be logged as a call sent to voicemail. The subscriber may also decide to forward the call as noted above. The additional call screen message will disappear and the additional call will be logged as a call forwarded and the current call is not interrupted. Lastly the subscriber may choose to ignore the call.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of managing a telephone call from a calling station to a called station having a telephone service, where the called station is connected to a data network comprising the steps of:
   forwarding the called station telephone service to an application server;
   responsive to a telephone call from a calling station, forwarding the telephone call to the application server regardless of a connection status of the called station;
   at the application server, obtaining from an Internet Access Server, an IP address relating to the called station, wherein the Internet Access Server is a different server from the application server;
   sending a screen viewable query to the called station via the data network requesting disposition of said telephone call, wherein the query includes a list of call disposition options for said telephone call, and wherein one of said list of call disposition options includes sending said telephone call to a voicemail system;
   receiving a decision on the disposition of said telephone call from the called station;
   performing an action according to the decision, wherein said action includes sending said telephone call to a voicemail system; and
   logging information related to the telephone call and the decision on the disposition of the telephone call, wherein the information is viewable via the data network.

2. A method as in claim 1, wherein said screen viewable query includes an option of answering said telephone call over the data network.

3. A method as in claim 1, wherein said screen viewable query includes an option of answering said telephone call using a public switched network.

4. A method as in claim 1, wherein said screen viewable query includes an option of ignoring said telephone call.

5. A method as in claim 1, wherein said screen viewable query includes an option of forwarding said telephone call to a different telephone number.

6. A method as in claim 1, wherein said screen viewable query includes an option of playing an announcement to the calling station.

7. A method as in claim 1, wherein said screen viewable query includes an option of placing the calling station on hold.

8. A method as in claim 1, wherein said screen viewable query includes an option of adding the calling station to a conference call bridge.

9. A method as in claim 1, wherein said screen viewable query includes an option of hanging up said telephone call.

10. A method of managing a telephone call from a calling station to a called station having a telephone service, where the called station is capable of connection to the Internet comprising the steps of:
    forwarding the called station telephone service to an intermediate server upon said called station launching an Internet connection;
    responsive to a telephone call from a calling station, forwarding the telephone call to the intermediate server regardless of a connection status of the called station;
    responsive to the telephone call from a calling station received by said intermediate server, obtaining from an Internet Access Server, an IP address relating to the called station, wherein the Internet Access Server is a different server from the intermediate server;
    sending a screen viewable communication to the called station including available calling station identification information and a query to the called station via the Internet requesting a decision from a list of call disposition options for said telephone call, wherein said query includes an option of sending said telephone call to a voicemail system;
    receiving a decision from the called station choosing at least one call disposition option;
    performing an action according to the call disposition option; and
    logging information related to the telephone call and the decision choosing at least one call disposition option, wherein the information is viewable via the Internet.

11. A method as in claim 10, wherein one of said list of call disposition options includes answering said telephone call over the Internet and said step of performing an action includes answering said telephone call over the Internet.

12. A method as in claim 10, wherein one of said list of call disposition options includes answering said telephone call using a public switched network and said step of performing an action includes answering said telephone call using a public switched network.

13. A method as in claim 10, wherein one of said list of call dispositions options includes ignoring said telephone call.

14. A method as in claim 10, wherein said list of call disposition options includes forwarding said telephone call to a different telephone number and said step of performing an action includes forwarding said telephone call to a different telephone number.

15. A method as in claim 10, wherein said list of call disposition options includes playing an announcement to the calling station and said step of performing an action includes playing an announcement to the calling station.

16. A method as in claim 10, wherein said list of call disposition options includes placing the calling station on hold and said step of performing an action includes placing the calling station on hold.

17. A method as in claim 10, wherein said list of call disposition options includes adding the calling station to a conference call bridge and said step of performing an action includes adding the calling station to a conference call bridge.

18. A method as in claim 10, wherein said list of call disposition options includes hanging up said telephone call and said step of performing an action includes hanging up said telephone call.

19. A method as in claim 10, wherein said list of call disposition options includes adding the available calling station identification information to a database and said step of performing an action includes adding the available calling station identification information to a database.

20. A method as in claim 10, wherein said list of call disposition options includes displaying information stored about the calling station and said step of performing an action includes displaying information stored about the calling station.

* * * * *